(12) United States Patent
Smith et al.

(10) Patent No.: US 8,073,840 B2
(45) Date of Patent: Dec. 6, 2011

(54) QUERYING JOINED DATA WITHIN A SEARCH ENGINE INDEX

(75) Inventors: Tim Smith, Waltham, MA (US); William Kimble Johnson, III, Waltham, MA (US); Rik Tamm-Daniels, Boston, MA (US); Sid Probstein, Chestnut Hill, MA (US)

(73) Assignee: Attivio, Inc., Newton, MA (US)

( * ) Notice: Subject to any disclaimer, the term of this patent is extended or adjusted under 35 U.S.C. 154(b) by 260 days.

(21) Appl. No.: 12/456,430

(22) Filed: Jun. 16, 2009

(65) Prior Publication Data
US 2010/0005054 A1 Jan. 7, 2010

Related U.S. Application Data

(60) Provisional application No. 61/073,156, filed on Jun. 17, 2008.

(51) Int. Cl.
*G06F 17/30* (2006.01)
(52) U.S. Cl. ............................................... 707/714
(58) Field of Classification Search .......... 707/706–708, 707/711, 713, 714, 723, 741, 763, 771, 802
See application file for complete search history.

(56) References Cited

U.S. PATENT DOCUMENTS

| | | | | |
|---|---|---|---|---|
| 5,594,898 A * | 1/1997 | Dalal et al. | ..... | 707/696 |
| 5,734,887 A * | 3/1998 | Kingberg et al. | ..... | 1/1 |
| 5,943,665 A * | 8/1999 | Guha | ..... | 707/718 |
| 5,987,453 A * | 11/1999 | Krishna et al. | ..... | 1/1 |
| 6,665,640 B1 | 12/2003 | Bennett et al. | | |
| 6,718,320 B1 * | 4/2004 | Subramanian et al. | ..... | 707/719 |
| 6,957,210 B1 * | 10/2005 | Ramesh | ..... | 707/745 |
| 6,957,222 B1 * | 10/2005 | Ramesh | ..... | 1/1 |
| 7,092,954 B1 * | 8/2006 | Ramesh | ..... | 707/714 |
| 7,353,350 B2 * | 4/2008 | Klassen et al. | ..... | 711/159 |
| 7,475,058 B2 * | 1/2009 | Kakivaya et al. | ..... | 1/1 |
| 7,546,306 B2 * | 6/2009 | Faerber et al. | ..... | 1/1 |
| 7,689,553 B2 * | 3/2010 | Zuzarte | ..... | 707/999.004 |
| 7,702,616 B1 * | 4/2010 | Li et al. | ..... | 707/999.002 |
| 7,720,838 B1 * | 5/2010 | Li et al. | ..... | 707/713 |
| 2007/0192306 A1 | 8/2007 | Papakonstantinou et al. | | |
| 2007/0260628 A1 * | 11/2007 | Fuchs et al. | ..... | 707/101 |

FOREIGN PATENT DOCUMENTS

WO WO 2004/095428 A2 11/2004

OTHER PUBLICATIONS

International Preliminary Report on Patentability and Written Opinion, PCT/US2009/003609, mailing date Dec. 29, 2010.

(Continued)

*Primary Examiner* — Cam-Linh Nguyen
(74) *Attorney, Agent, or Firm* — Hamilton, Brook, Smith & Reynolds, P.C.

(57) ABSTRACT

Techniques and systems for indexing and retrieving data and documents stored in a record-based database management system (RDBMS) utilize a search engine interface. Search-engine indices are created from tables in the RDBMS and data from the tables is used to create "documents" for each record. Queries that require data from multiple tables may be parsed into a primary query and a set of one or more secondary queries. Join mappings and documents are created for the necessary tables. Documents matching the query string are retrieved using the search-engine indices and join mappings.

38 Claims, 13 Drawing Sheets

OTHER PUBLICATIONS

Agrawal, S., et al., "DBXplorer: A System for Keyword-Based Search over Relational Databases," *Proceedings of the 18th International Conference on Data Engineering*, pp. 1-12 (2002).

Hristidis, V., et al., "Discover: Keyword Search in Relational Databases," *Proceedings of the 28th VLDB Conference*, pp. 1-12 (2002).

"Attivio, An Interview with Ali Riaz," May 27, 2008, Retrieved from internet Mar. 9, 2009, http://arnoldit.com/search-wizards-speak/attivio.html, pp. 1-5.

"Beyond Search, News and Information from ArnoldIT.com about search and content processing . . ." May 23, 2008, Retrieved from internet Mar. 9, 2009, http://arnoldit.com/wordpress/2008/05/23/attivio-interview-runs-on-may-27-2008, pp. 1-4.

Notification of Transmittal of the International Search Report and the Written Opinion of the International Searching Authority, PCT/US2009/003609, date of mailing Sep. 17, 2009.

* cited by examiner

JOIN MAPPINGS

810 → A: {(C1: USA), (C2: SA), (C3: INDIA), (M1: USA), (M2: SA), (M3: RUSSIA), ....}

B:    USA    → {C1, M1}
820 →    SA    → {C2, M2}
    INDIA    → {C3}
    RUSSIA    → {M3}
    •
    •
    •

FIG. 8

QUERYING JOINED DATA WITHIN A SEARCH ENGINE INDEX

RELATED APPLICATION(S)

This application claims the benefit of U.S. Provisional Application No. 61/073,156, entitled "Querying Joined Data Within a Search-Engine Index," filed on Jun. 17, 2008. The entire teachings of the above application are incorporated herein by reference.

BACKGROUND OF THE INVENTION

The increased availability of computer systems and the ability to connect the computer systems using various networks such as intranets and the Internet, for example, has made vast repositories of information available to a large number of people. In many instances, having such a large amount of information at one's fingertips greatly enhances productivity.

But these advances in information accessibility and processing have created other challenges, e.g., how to search and manage such a large collection of information, especially when the information is stored in various formats and repositories. Many new tools have been developed to deal with the ever-expanding volume of information that is now available for consumption in an electronic form.

For example, referring to FIG. 1, conventional record-based data storage 100 is typically organized around the concepts of tables, columns and rows. A table is defined by a series of columns, each having certain characteristics (i.e., corresponding to a particular category of data, e.g., a name or date), and the data is stored as rows in the tables. For example, a database of customer-related data may include a CUSTOMER table 110, having columns for CUST_ID (customer identifier), L_NAME (last name), and F_NAME (first name). Another table (the PURCHASES table 115) may include data related to purchases made by the customers, and be defined as having columns named CUST_ID, PUR_ID (purchase identifier) and PUR_DATE (purchase date). Furthermore, each purchase may include more than one product, so a PRODUCT table 120 may be defined as having a PUR_ID column and a PRO_ID (product identifier) column. Such an arrangement allows for multiple purchases (each may have more than one product) to be recorded for an individual customer without having large amounts of redundant data (e.g., having to store data in the LAST NAME for every purchase). As an example, customer number 00001 (Ann Smith) made three purchases (PUR_IDs 9901, 9902 and 9903). Further, one of those purchases (9901) included two products, AAAA and BBBB. However, a simple inquiry into one table (e.g., the PURCHASES table 115) may not provide all the desired information for a report because certain descriptives such as customer names and product names are stored in other tables.

To accommodate queries and other data transactions that require data from more than one table, certain columns may be designated as foreign keys. A foreign key is a referential constraint between two tables that identifies a column (or a set of columns) in one table (typically referred to as the "referencing" table) that refers to a column or set of columns in another table (the "referenced" table). Using the example above, the CUST_ID column serves as a foreign key from the CUSTOMER table 110 to the PURCHASES table 115, and the PUR_ID column serves as a foreign key to the PRODUCT table 120. Therefore, a request to retrieve a listing of all products purchased by customer 00001 with the customer's name and date of purchase may be formulated as follows:

```
Select CUSTOMER.F_NAME, CUSTOMER.L_NAME,
PURCHASES.PUR_DATE, PRODUCT.PRO_ID from
CUSTOMER, PURCHASES, PRODUCT where
CUSTOMER.CUST_ID = PURCHASES.CUST_ID,
PURCHASES.PUR_ID = PRODUCT.PUR_ID, CUST_ID ='00001'
``` by taking advantage of the foreign keys from each table. Such an approach works well for applications that utilize a database interface for information retrieval. However, with the increased popularity and simple user interface of search engines, the desire to use conventional database retrieval techniques has waned.

Unfortunately, database design techniques that are aimed at reducing data redundancy and enforcing data normalization rules typically do not support full-text indexing and querying of text documents as do modern search engines.

For example, the World Wide Web ("WWW" or "web") can provide access to a vast amount of information, and specialized search tools, known as "search engines" (e.g., Google, Yahoo, and MSN Search) have achieved great success in facilitating searching of static text documents. Conventional web-based search engines, however, are not designed for use in an enterprise environment because data can be stored in many different forms, using various localized repositories and databases. While a data repository on the Internet or an intranet may contain record-based data relevant to a search query, the search engine may not be capable of indexing and/or accessing the data. A similar problem may be encountered with other forms of content such as word-processing documents, graphical or image files, MP3 clips, interactive blogs, and other data that may change in real time.

Conventional methods of executing a query referencing multiple tables in a search engine tend to fall into one of two categories: (i) denormalization, in which the joined tables must be combined at index time, or (ii) subdivision, where the query is divided into two or more table queries which are processed independently, and the results combined in a post-processing phase. Denormalization has several drawbacks, primarily the increase in the size of the index, because tables with multiple foreign keys can expand by orders of magnitude after denormalization. The post-processing approach involves extracting a large volume of data from the index (typically the entire contents of one or more tables) and then winnowing the data down based on the join constraints. This is also an inefficient use of resources.

SUMMARY OF THE INVENTION

What is needed is a technique and system for utilizing search engines to efficiently query and retrieve structured data that can be stored in multiple tables of a record-based database.

A method and corresponding article of manufacture, having computer readable program portions, relate to accessing data in a record-based data storage system using a search engine in response to a join query. Multiple database tables are indexed using a search engine. Rows in each database table are mapped to documents in the search engine, and table columns are mapped to document fields. Documents are searched and join mappings are stored. Using an index (i.e. the search engine index), primary and secondary result sets are returned for primary and secondary queries of the join query. Using the join mappings, documents are identified from the primary result sets and the secondary result sets that have common field values. Further, at least a subset of the identified documents are retrieved from the primary result sets and the secondary result sets that have common field values.

Advantageously, in some applications, join queries are executed without having to retrieve a large volume of data from disk. By using features of a scalable Information Retrieval (IR) library (e.g., Lucene), join mappings that map join field values to internal document IDs are extracted from the search engine index. When a join query is detected, a primary query, a set of one or more secondary queries, and corresponding join fields are extracted from the join query. The primary query and secondary queries are executed against an index, resulting in primary and secondary result sets. Join constraints in the join query are then enforced by using the join mappings to identify documents from the primary and secondary result sets that have common field values. After the documents are identified, the queried for documents are retrieved from disk.

The join mappings may be used to identify values for fields relative to documents. Alternatively, the join mappings may be used to identify documents relative to values for fields. In addition, the join queries may be used to identify a field on which a join is performed.

The join query may comprise an inner join between the primary and secondary queries of the join query. Alternatively, the join query may comprise an outer join between the primary and secondary queries of the join query.

Further, the identified documents may be filtered according to the join query.

Join mappings may be stored in volatile memory. Storing join mappings may include i) determining if sufficient volatile memory is available to store the join mappings; ii) if sufficient memory exists, storing the join mappings in volatile memory; and iii) if sufficient memory does not exist, deleting existing join mappings and storing the new join mappings. When deleting, the least recently used join mappings may be deleted.

A combined score may be computed for each of the identified documents from the primary result sets and the secondary result sets that have common field values. Further, each of the identified documents may be ranked from the primary result set and the secondary result sets that have common field values as a function of at least the combined score and present the at least a subset of the identified documents in a list of results on a display according to the ranking.

An electronic system of accessing data in a record-based data storage system using a search engine in response to a join query may comprise a search engine, storage, and join engine. The search engine may be configured to provide indices and return result sets from the indices in response to queries. The storage may store the indices and result sets. The join engine may be configured to query the search engine to provide join mappings to storage. Further, the join engine may be configured to query the search engine to return primary and secondary result sets for primary and secondary queries of the join query. The join engine may also be configured to use the join mappings and result sets to identify documents from the primary result sets and the secondary result sets that have common field values. The search engine may be configured to retrieve at least a subset of the identified documents from the primary result sets and the secondary result sets that have common field values.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 8 is a graphical representation of join mappings employed in querying joined data using an index;

DETAILED DESCRIPTION OF THE INVENTION

A description of example embodiments of the invention follows.

The teachings of all patents, published applications and references cited herein are incorporated by reference in their entirety.

A relational database is a database that groups data using common attributes found in the data set. The resulting "clumps" of organized data are much easier for people to understand. For example, a data set containing all the real estate transactions in a town can be grouped by the year the transaction occurred; or it can be grouped by the sale price of the transaction; or it can be grouped by the buyer's last name; and so on. Such a grouping uses the relational model (a technical term for this schema). Hence such a database is called a "relational database." Relational databases are currently the predominate choice in storing financial records, manufacturing and logistical information, personnel data and much more.

Strictly, a relational database is a collection of relations (frequently called tables). Other items are frequently considered part of the database, as they help to organize and structure the data, in addition to forcing the database to conform to a set of requirements. As stated above, a table is defined by a series of columns, each having certain characteristics and mapping to a field (i.e., corresponding to a particular category of data, e.g., a name or date), and the data is stores as rows in the tables.

Figure 1:
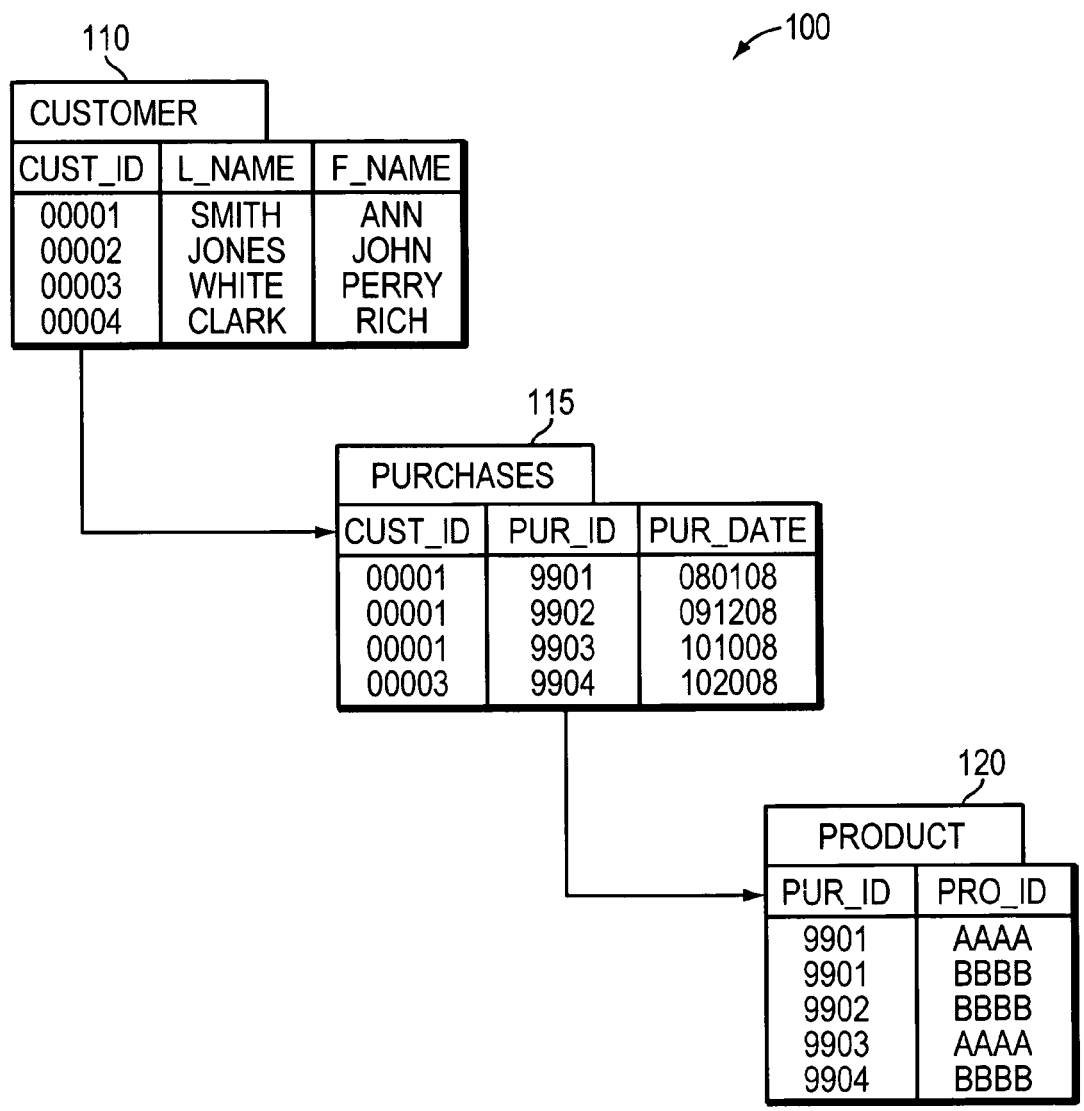
FIG. 1 is a graphical representation of a conventional table-based relation database schema for a collection of customer purchases data.
Figure 2:
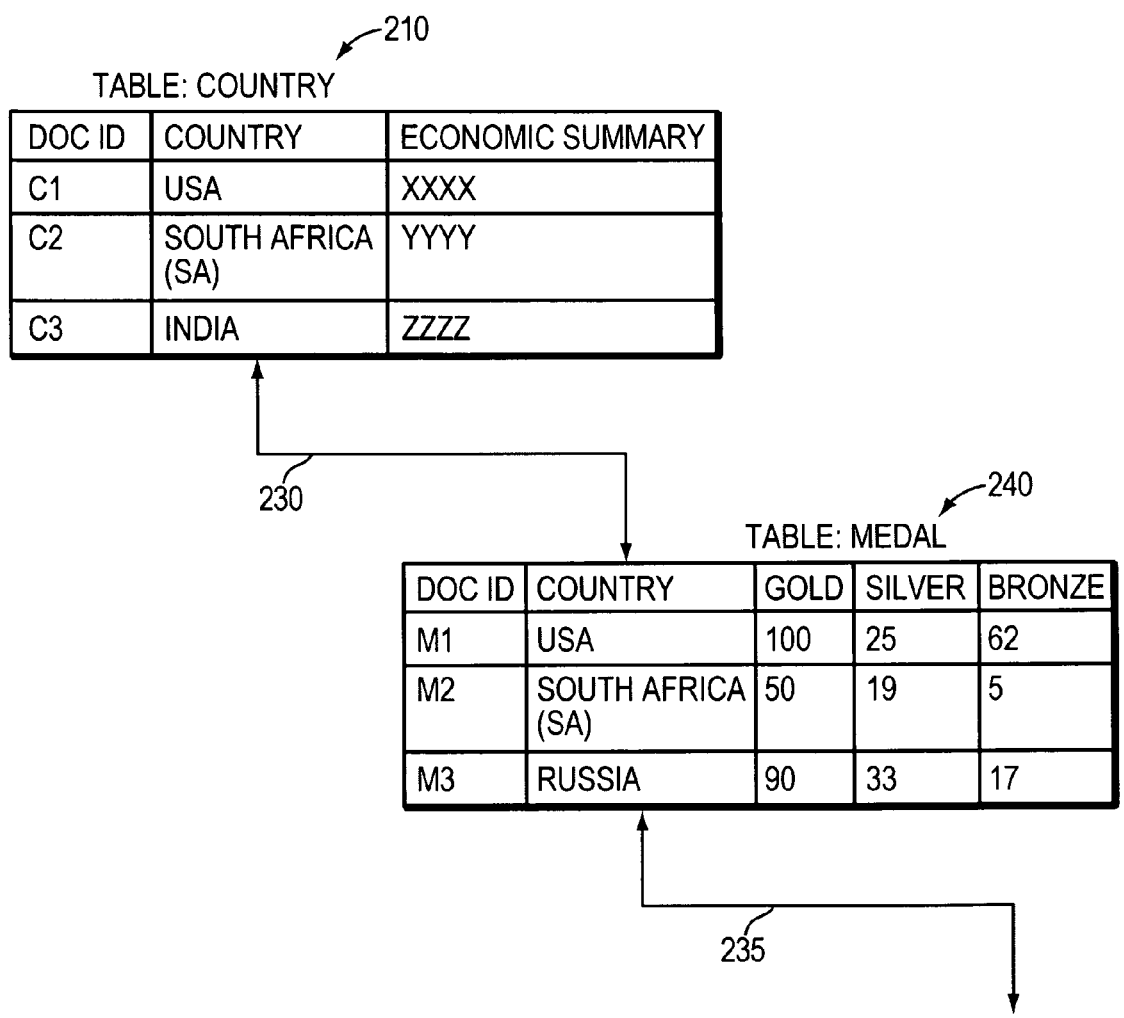
FIG. 2 is a graphical representation of a conventional table-based relational database schema for a collection of economic summaries related to specific countries.

FIG. 2 is a graphical representation of a conventional table-based relational database schema for a collection of economic summaries related to specific-countries. For example, a database of country-related data may include a Country table 210, having a column for a Country field, and Economic Summary field that contains economic summaries related to a specific country (e.g., gross domestic product, inflation, unemployment, monetary unit, natural resources). Another table (the Medal table 240) may include data related to the number of gold, silver, and bronze medals won by a specific country during the Olympics. As illustrated, the Country field 215 serves as a foreign key 230 to the Medal table. For illustration purposes only, the Country table 210 and Medal table 240 contain three rows of information. However, tables typically include many rows of information.

In general, techniques and systems are provided for indexing and retrieving data and documents stored in a record-based database management system (RDBMS) using a search engine interface. Search-engine indices are created from tables in the RDBMS that map unique document numbers ("Doc IDs" or "document IDs", used interchangeably throughout) to keys (e.g., foreign and/or primary keys) for each table. Data from the tables within the RDBMS is used to create a "document" for each record (typically a row in a table) as a string of field/value pairings. Queries submitted to a search engine may then refer to the search-engine index to find the Doc IDs associated with the correct index value, and the Doc IDs are then used to locate the correct document. Queries that include "join" clauses (clauses linking fields from different tables based on a common value) may be parsed into a primary query and a set of one or more secondary queries, and in such cases join mappings and documents are created for the necessary tables. The resulting documents may be scored and/or ranked and presented to a user in response to a search query.

Data stored as records in a database may be stored in a index, or search-engine index as a set of (field, value) pairs. Using such notation, each table row is represented as a searchable document, with the table columns as field names, and the row values as the field values. Using the example above, a record from the Medal table 240 can be represented using the following notation:

{(Country; USA), (Gold, 100), (Silver, 25), (Bronze, 62)} with each table row "document" being assigned a unique document ID. Databases containing multiple tables may be represented as a single index (e.g., records from different tables can all be stored in the same index and have unique document IDs). In some implementations, groups of tables (based, for example on data type, data format and/or data usage) may be combined into a collection of indices; in most cases, there are fewer indices than tables.

Figure 3:
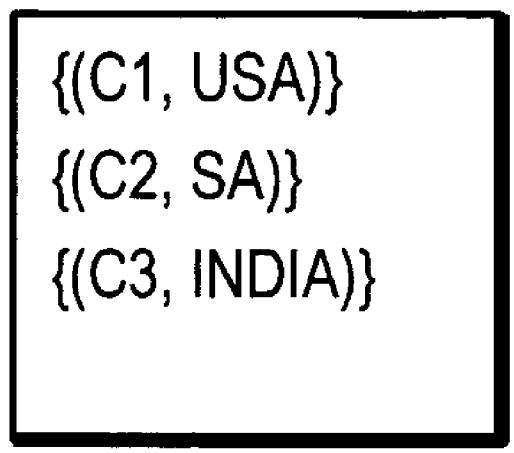
FIG. 3 is a graphical representation of a collection of indexed documents created from the tables of FIG. 2.
Figure 3:
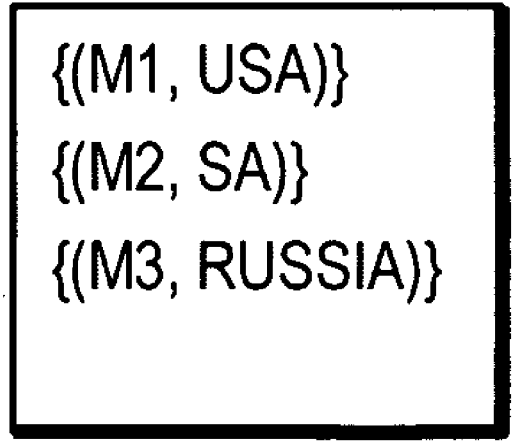

FIG. 3 illustrates a collection of indices 300 created using one implementation of this technique as applied to the tables of FIG. 2. Because each row in an index or table is a searchable document, each row includes a unique document ID. Country table 210 includes one field that is to be used as a foreign key 230 (Country field) and therefore index 310 includes a unique document ID for each row and the corresponding foreign key value (Country value) for each record. Similarly, the Medal table 240 has a foreign key 235 (Country field). Therefore, another index 320 is created for the Medal table 240. Index 320 includes a unique document ID for each row (M1, M2, and M3) to specify each searchable document, and corresponding foreign key value for each record. Other indices may be created based on other tables, reporting requirements, and other functions of other application(s) supported by the database.

Figure 4:
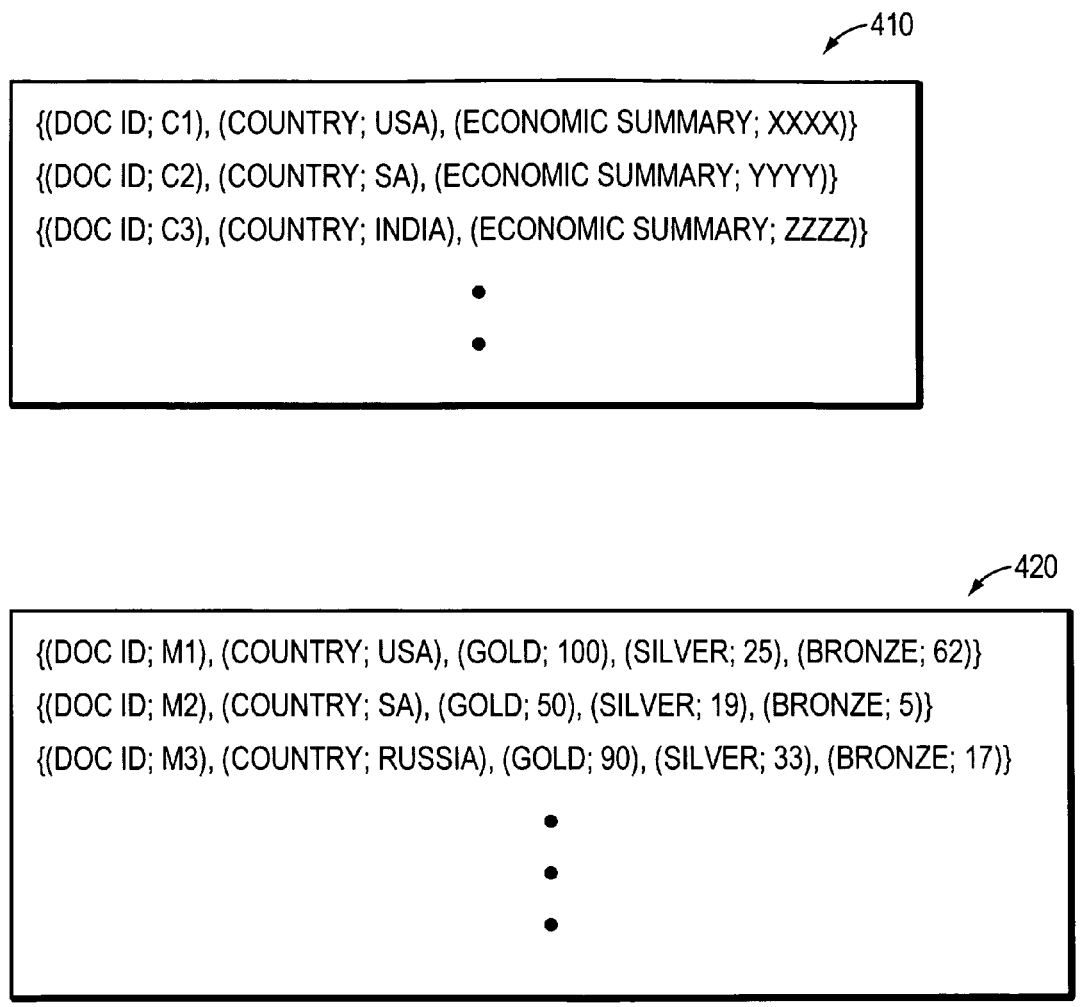
FIG. 4 is a graphical representation of fully enumerated documents that include data from the tables of FIG. 2.

FIG. 4 illustrates a collection of fully enumerated documents 410, 420 corresponding to the tables of FIG. 2 that are included in search-engine index. By using the indices described in FIG. 3 and separately storing the data as individually searchable documents, each corresponding to a table row, primary document sets and secondary document sets, linked via foreign keys, can be identified and combined to present a complete result set. For example, the document set 410 includes strings of key-value pairs and field-value pairs for each record in the Country table 210. Queries searching for economic summaries of specific countries would use the Country table 210 as the primary table. For example, in the following query:

Select Country.Country, Country.Economic Summary from Country where Country = 'USA' the field following the "Select" clause are primary keys in the Country table 210. In processing the query, the index 310 is first searched to identify the document IDs that include the desired Country value (in this case "USA"), and then retrieve the document with the corresponding document IDs from document set 410. Similarly, document set 420 provides fully enumerated listings of data in the Medals table 240 of FIG. 2.

In some instances, queries having join clauses (e.g., requiring data from multiple tables joined on fields having a common value) are submitted to a search engine. A JOIN clause combines records from two tables in a database. It creates a set that can be saved as a table or used as is. A JOIN is a means for combining fields from two tables by using values common to each. JOIN clauses may include an inner join or outer join between two tables in a database. An inner join requires each record in the two joined tables to have a matching record. An inner join essentially combines the records from two tables (A and B) based on a given join-predicate. An outer join does not require each record in the two joined tables to have a matching record. The joined table retains each record—even if no other matching record exists.

Figure 5:
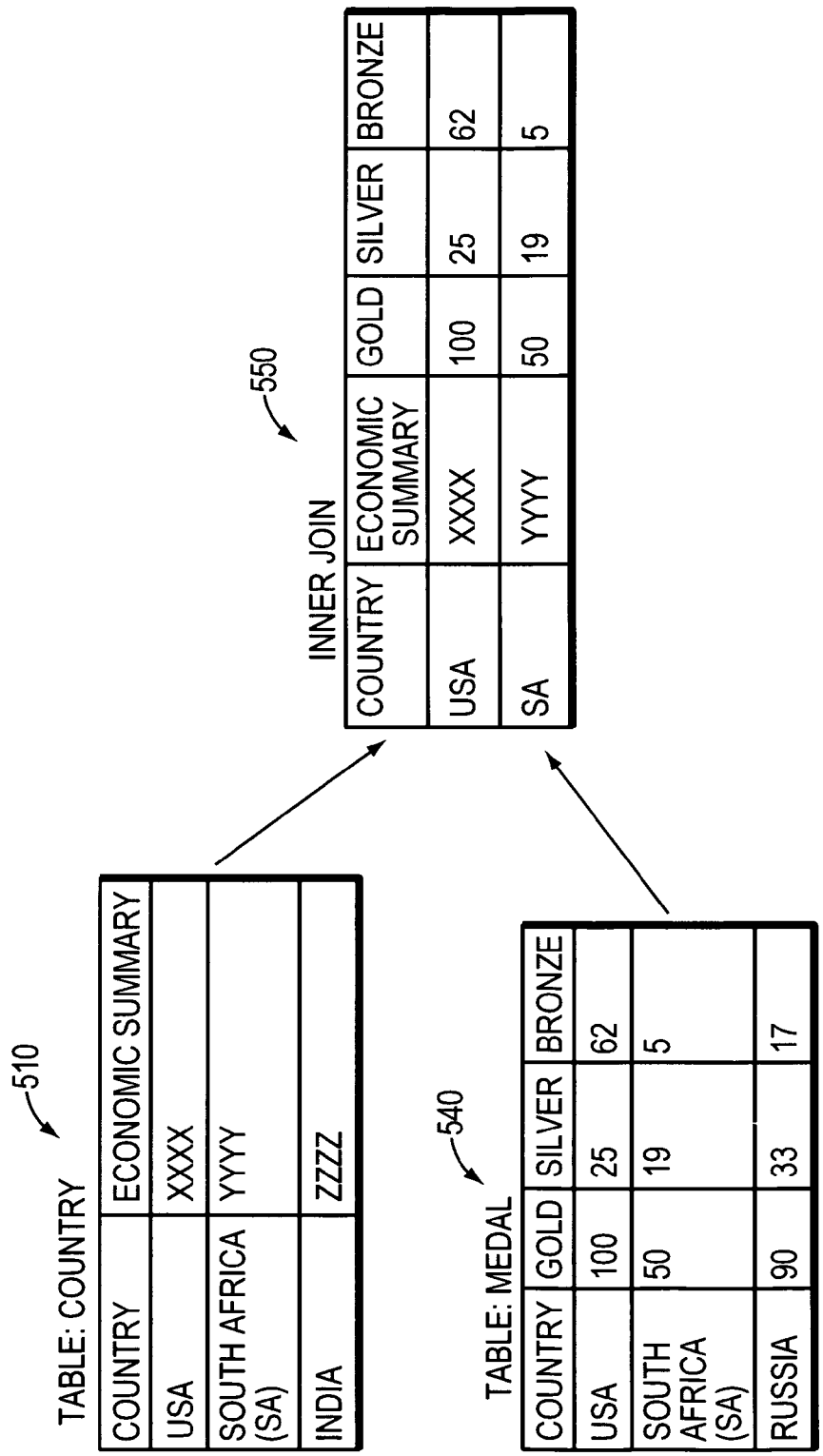
FIG. 5 is a graphical representation of an inner join between two tables in a conventional table-based relational database schema.

FIG. 5 is a graphical representation of an inner join between two tables in a conventional table-based relational database schema. A query whose aim is to produce all documents from table Country 510 and table Medal 540 having Country values that match may be queried as follows:

Select * from Country, Medal where Country.Country = Medal.Country.

The inner join would produce an inner join table 550 that contains a document set of all documents whose Country field value matched including the associated fields for each document from each table. As a result, inner join table 550 contains the foreign key (Country), and the following associated fields: Economic Summary, Gold, Silver, and Bronze. Because the inner join function only produces the document whose Country values matched, the document containing the Country value India from table Country 510 and the document containing the Country value Russia from table Medal were not produced in the inner join table 550.

Figure 6:
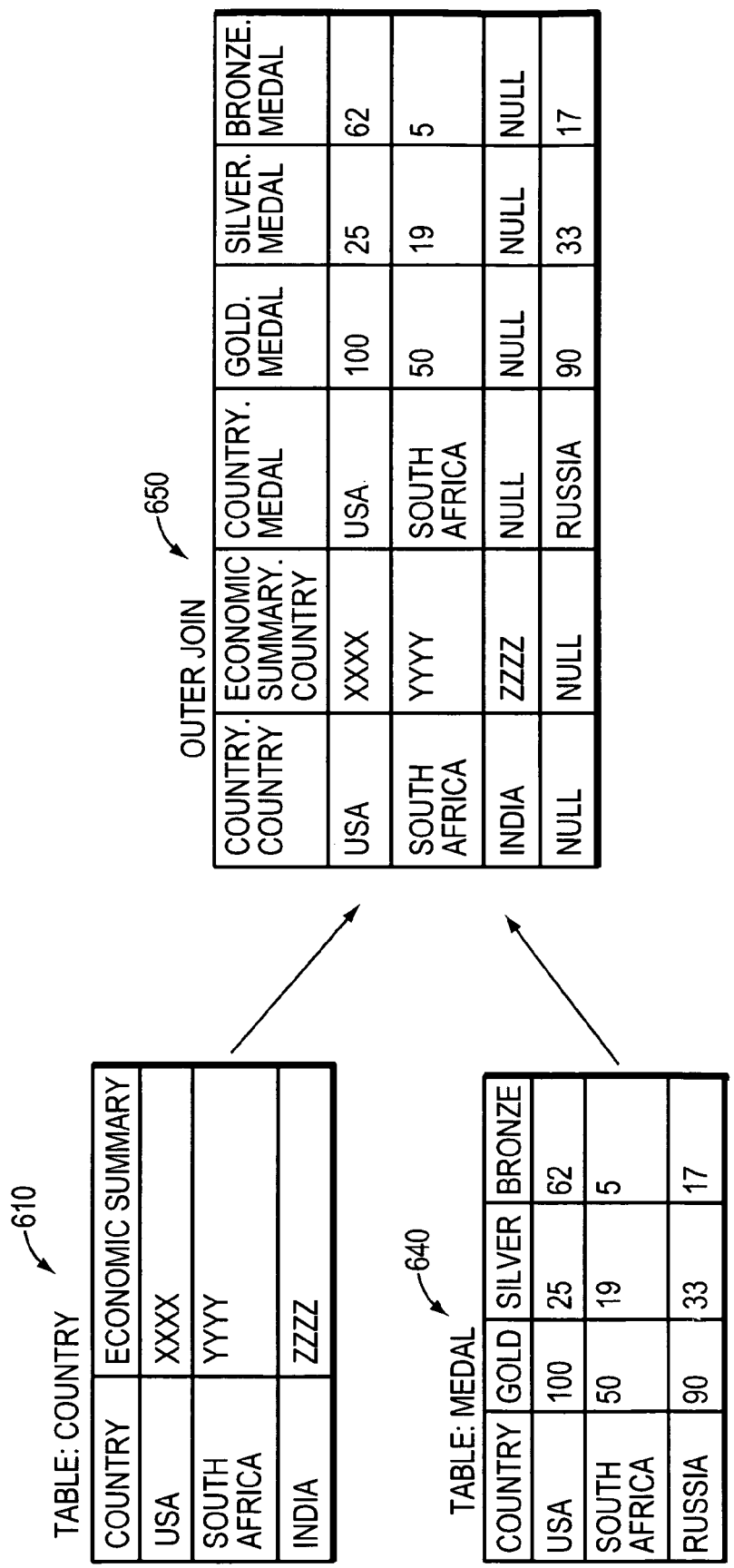
FIG. 6 is a graphical representation of an outer join between two tables in a conventional table-based relational database schema.

FIG. 6 is a graphical representation of an outer join between two tables in a conventional table-based relational database schema. As stated above, an outer join does not require each record in the two joined tables to have a matching record. Therefore, a full outer join between table Country 610 and table medal 640 would produce join table 650. As illustrated, join table 650 contains every record from each table even if there is not a matching Country value. The document containing Country value India from table Country 610 and the document containing Country value Russia from table Medal 640 are produced in the join table 650. Because table Medal 640 does not have a document for Country value India, the field values in join table 650 that correspond to the field values from table Medal 640 are NULL. Similarly, the field values for Country value Russia from table Country 610 are Null.

Full Outer Joins may be subdivided into left outer joins and right outer joins. The result of a left outer join (or simply left join) for table Country 610 and Medal 640 always contains all records of the "left" table (Country 610), even if the join-condition does not find any matching record in the "right" table (Medal 640). This means that a left outer join returns all the values from the left table (Country 610), plus matched values from the right table (Medal 640) (or NULL in case of no matching join predicate). Therefore, the resulting join table would produce all the documents from outer join table 650, except for the document containing Country value Russia. A right outer join (or right join) closely resembles a left outer join, except with the treatment of the tables reversed. Every row from the "right" table (Medal 640) will appear in the joined table at least once. If no matching row from the "left" table (Country 610) exists, NULL will appear in columns from Country 610 for those records that have no match in Country 610. Therefore, the resulting join table would produce all the documents from outer join table 650, except for the document containing Country value India.

A technique for indexing and retrieving data and documents stored in a record-based database management system (RDBMS) using a search engine interface may include extracting a large volume of data (documents) from the index (typically the entire contents of one or more tables), retrieving the identified documents from disk, and then winnowing the documents down based on join constraints. However, an approach that requires retrieval of documents to perform the join constraints also requires substantial processing time.

Figure 7:
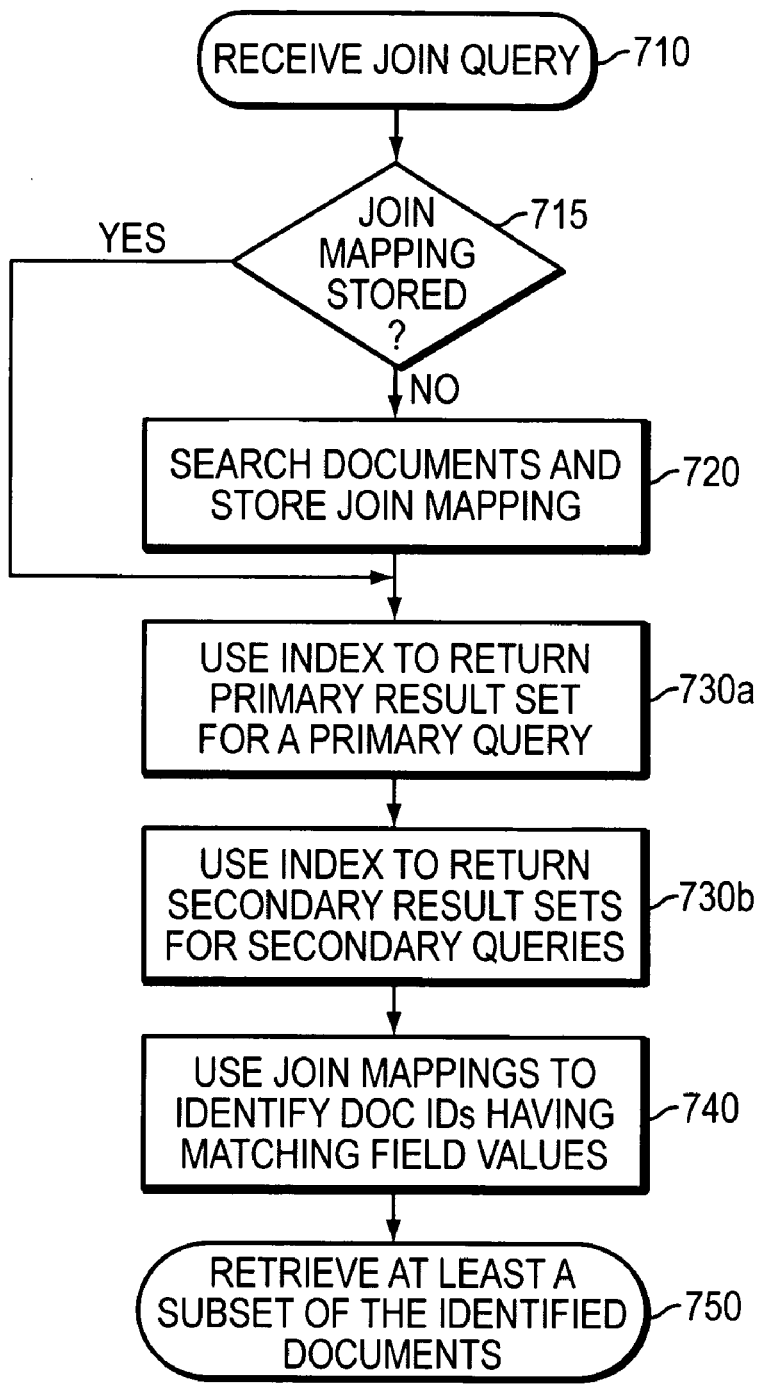
FIG. 7 is a flow diagram of a method for querying joined data using an index and performing a join operation.

FIG. 7 is a flow diagram of a method 700 for querying joined data using an index and performing a join operation without having to retrieve a substantial number of documents that are then filtered. At step 710, the method begins by receiving a query from a search engine interface to join information from at least two different tables in a record-based management system (RDBMS). In response to the query, at 715, the method determines if a join mapping required for the join query is stored in memory. If so, the method continues to steps 730a and 730b. If not, the method, at 720, searches for related documents in an index, or search-engine index, and stores join mappings. At 730a, the method then uses the index to identify and return a first result set containing document IDs from a primary query parsed from the join query. Contemporaneously, the method uses the index to identify and return secondary result sets containing document IDs from secondary queries parsed from the join query at 730b. The method then uses the stored join mappings to identify document IDs that have matching field values from the first result set and secondary result sets at 740. The method, at 750, retrieves at least a subset of the identified document IDs that have matching field values from the first result set and secondary result sets. Although the method 700 is shown to transpire in a particular sequence, other sequences are possible, as well, in other embodiments.

As stated above, data is stored in an index as a set of (field, value) parings. As such, the index may hold a pairing consisting of a document ID field, and foreign-key value as illustrated in FIG. 3. A foreign key is a referential constraint between two tables. The foreign key identifies a column or a set of columns in one (referencing) table that refers to a column or set of columns in another (referenced) table. Therefore, from the search-engine index, join tables may be created that consist of join mappings of document IDs to foreign key values or foreign key values to document IDs associated with documents having the value. Because foreign key values may be mapped to document IDs, join tables may be created dynamically for a specific query. In addition, join tables may exist for every field that serves as a foreign key. The join tables may be stored as hash tables that associate keys from each of the tables with their corresponding values in order to efficiently find records given a key and find the corresponding value. The hash tables may transform the key using a hash function into a number that is used as an index in an array to locate the desired location ("bucket") where the values should be found. The tables can be created during a pre-processing phase and persist in storage, or, in other cases the tables may be created dynamically at query time and stored in cached memory.

FIG. 8 illustrates join mappings for the foreign key "Country." Join mappings may be stored in a join table as an index in an array. Join mapping A 810 contains the set of document IDs in a RDBMS that contain the foreign key "Country." Join mapping A 810 allows a search-engine index, in response to a join query, to immediately identify all the documents that have the foreign key in which the join query is employing to join data from at least two different tables in the RDBMS. Join mapping B 820 contains the set of document IDs associated with a specific foreign key value. As illustrated in FIG. 8, documents IDs C1 and M1 are associated with the foreign key value "USA." Join mapping B 820 allows a search-engine index, in response to a join query, to immediately identify all the documents that have a specific foreign key value in which the join query is employing to join data from at least two different tables in the RDBMS.

Join mapping B 820 may be represented as a bit map for each value. For example, the bit map for the Country value 'USA' may be illustrated as:

{10100 . . . } in relation to table Country 210 and table Medal 240 of FIG. 2, wherein each position in the bit map, represents document IDs C1, C2, M1, M2, and M3, in order, and '1' indicates a true value and '0' indicates a false value.

Figure 9A:
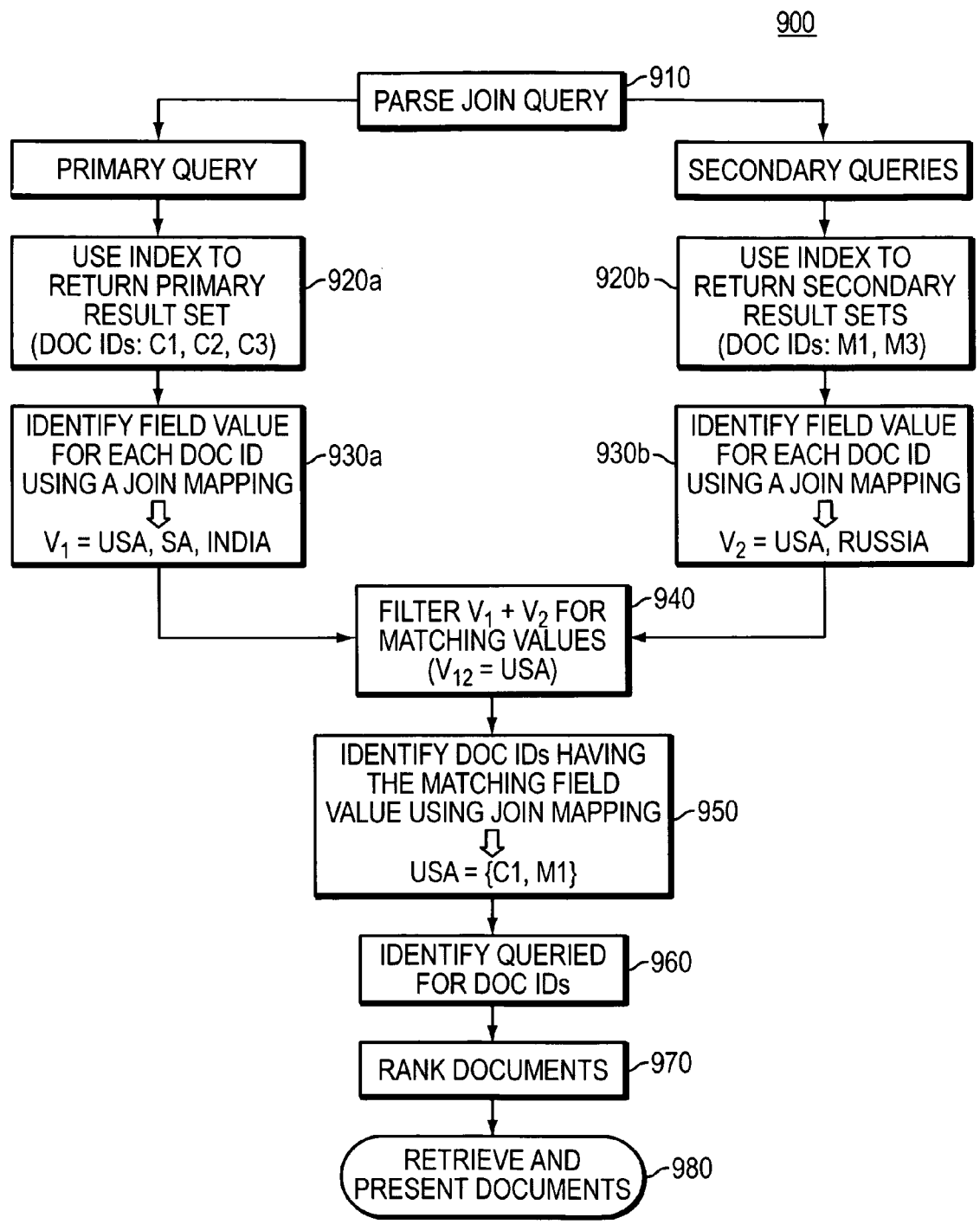
FIG. 9A is a flow diagram of a more specific method for querying joined data using a join mapping derived from an index and performing a join operation.

FIG. 9A is a flow diagram of a more specific method 900 for querying joined data using a join mapping derived from an index. The method begins at step 910 by parsing a join query received at a search-engine interface into primary and secondary queries. From the primary query, the method, at 920a, uses an index to return a primary result set containing the document IDs related to the primary query. The method, at step 920a, does not retrieve documents from disk, but rather returns a result set of document IDs from the index. Contemporaneously, the method, at 920b, returns secondary result sets, from the index, related to the secondary queries. Using the join mapping A as illustrated in FIG. 8, at step 930a, the method identifies the key value for each identified document ID from the primary result sets as a primary value set ($V_1$). Similarly, at 930b, the method identifies the key value for each identified document ID from the secondary result sets as a secondary value sets ($V_2$). At step 940, the method then compares the primary value set and the secondary value sets and filters for values that match as matching value set ($V_{12}$).

Figure 9B:
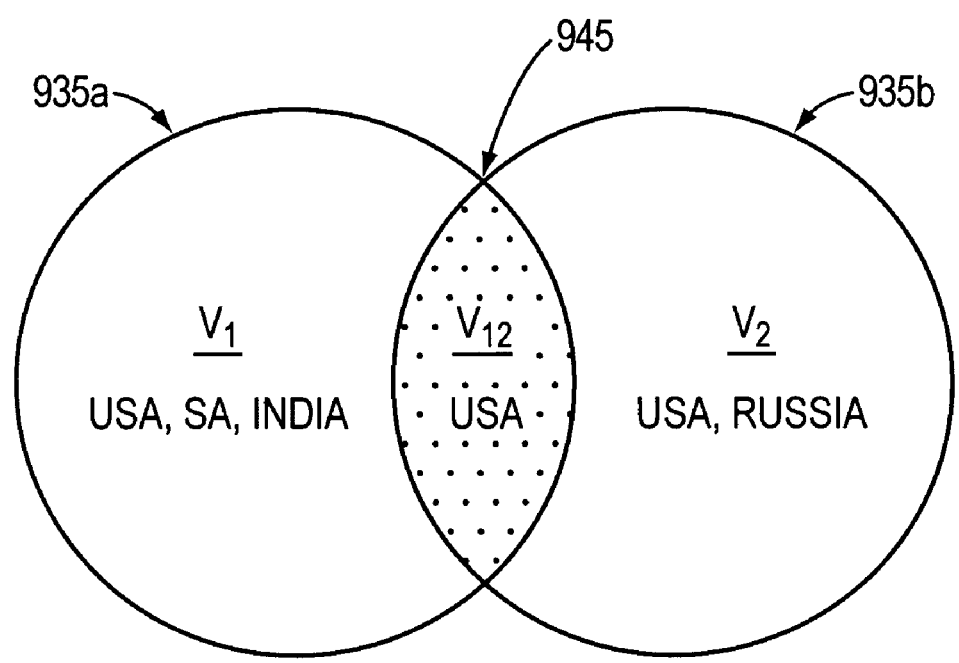
FIG. 9B is a Venn diagram of the relationship between the collection of field values of primary and secondary result sets.

FIG. 9B illustrates the relationship between the collection of value sets of primary and secondary result sets. As stated above, the method 900 compares the primary value set 935*a* and the secondary value sets 935*b*. Section 945 indications where the primary value set and the secondary value sets have a common relationship. The method finds this common relationship and at 940 filters out the matching value(s) 945.

Continuing with FIG. 9A, the method 900 then at 950 uses the join mapping B from the join mappings illustrated in FIG. 8 to identify all documents in the database that have the matching value from step 940. Next, at 960 the method identifies the queried for document IDs, by filtering for common document IDs between the identified documents in step 950 and one of the following: the primary result set, secondary result sets, or combination of primary and secondary result sets. The method then at 970 ranks the documents according to scoring system for each document that computes a combined score for each primary document and secondary document that have common field values. At step 980, the method retrieves the documents from the database by using the document IDs, and presents the documents according to the ranking. Although the method 900 is shown to transpire in a particular sequence, other sequences are possible, as well, in other embodiments.

For example, assume that a join query was received that requested economic summaries for countries that won more than 50 gold medals in the past Olympics. At step 910, the method 900 parses a join query into a primary query and a secondary query. Generally, the primary query would query for all documents in the table Country as illustrated in FIG. 2. However, the method, at 920*a*, does not require querying the database, but will return a primary result set containing documents IDs associated with documents in the table Country 210 by querying a search-engine index. Similarly, at 920*b* the method returns a secondary result set containing document IDs associated with documents in the table Medal related to the secondary query. At steps 920*a* and 920*b*, the method 900 has identified document IDs C1, C2, and C3 in a primary result set, and documents M1 and M3 in a secondary result set.

Using the join mapping A illustrated in FIG. 8, at steps 930*a-b*, the method identifies the value of the foreign key 'Country' for each document ID from the primary result set and the secondary result sets. Value Set 1 ($V_1$) for the primary result set includes the 'Country' values 'USA,' 'SA,' and 'India.' Value Set 2 ($V_2$) for the secondary result set includes the 'Country' values 'USA,' and 'Russia.' The method then at 940 filters Value Set 1 and Value Set 2 for matching values. This filtering is illustrated in the Venn diagram of FIG. 9B wherein, the matching value 945 is 'USA.' Using the join mapping B illustrated in FIG. 8, at step 950, the method identifies all the documents in the database that have the value 'USA.' In this example embodiment, the join table for field/key 'Country' contains all the documents in the database that contain the field/key 'Country.' In alternate embodiments, the joint mappings may be limited to the documents produced in the primary result set and the secondary result sets.

The method then at 960 identifies the queried for document IDs by intersecting the documents from join mapping B for the value USA with the document IDs from the primary result set because the query is only interested obtaining documents containing economic summaries. In this example, C1 is the only document that matches. The method then at 970 ranks the intersected documents, in this example, ranking may not be necessary because only one document was identified, but in the situation where more than one document is identified, the method ranks each identified document by computing a combined score for the identified document and all associated child documents, which are documents linked by foreign keys. In this example, the child document for document C1 would be document M1. The method then at 980 retrieves document C1 from the database and presents the document in a results list on a display.

Figure 10:
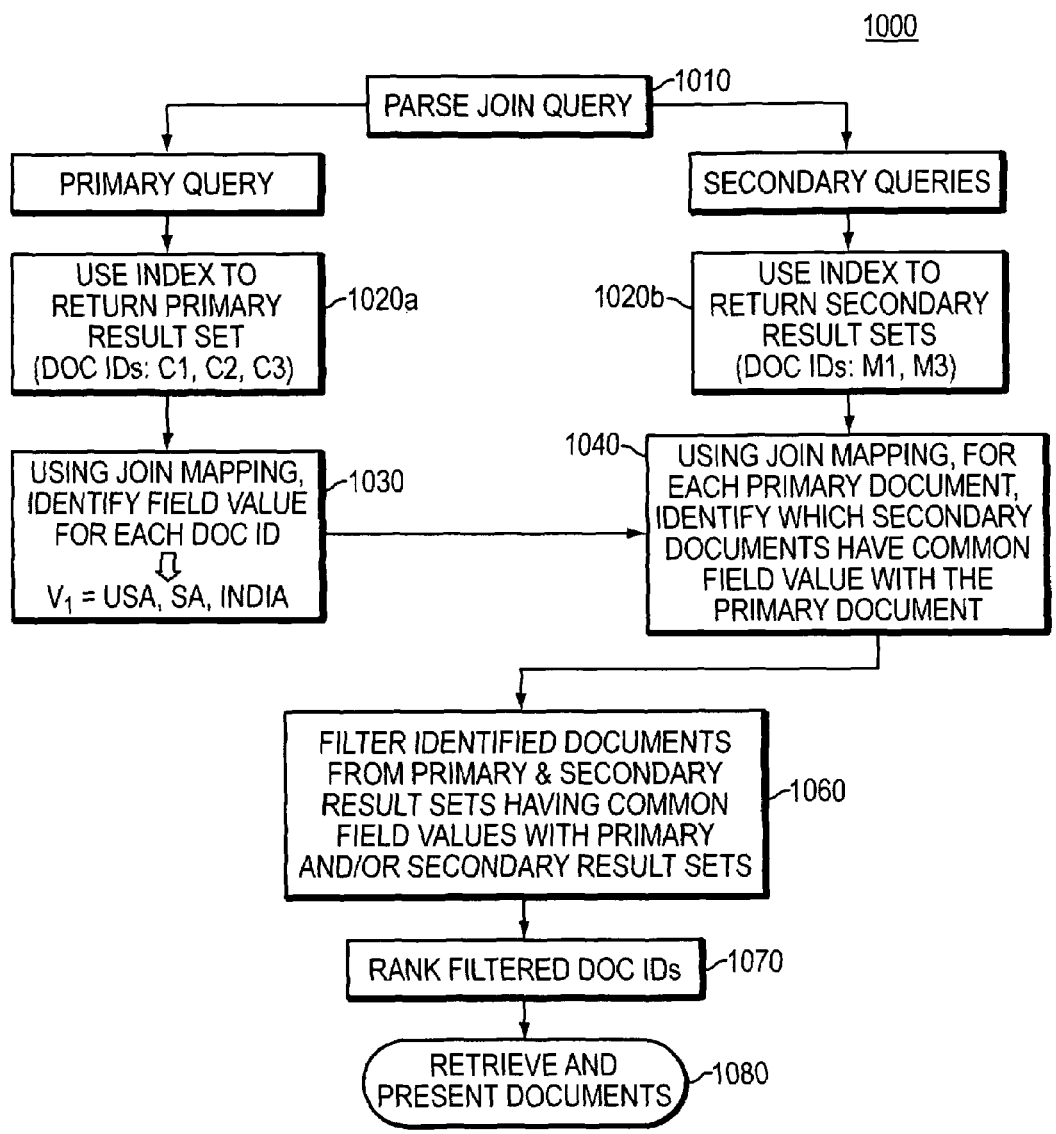
FIG. 10 is a flow diagram of an alternate more specific method for querying joined data using a join mapping derived from an index and performing a join operation.

FIG. 10 is a flow diagram of an alternate more specific method 1000 for querying joined data using a join mapping derived from an index. The method begins at 1010 by parsing a join query received at a search-engine interface into primary and secondary queries. From the primary query, the method at 1020*a* uses the index to return a primary result set containing the document IDs related to the primary query. The method, at step 1020*a*, does not retrieve documents from disk, but rather returns a result set of document IDs from the index. Contemporaneously, the method, at 1020*b*, returns secondary result sets, from the index, related to the secondary queries.

Using the join mapping A as illustrated in FIG. 8, at step 1030, the value of the join field is extracted for each document identified in the primary result set. At 1040, using the join mapping, the method determines the set of secondary documents to be attached to each primary document by identifying the set of secondary documents that have common join field values with each primary document. If the join query specifies an inner join and no secondary documents are found, the primary document is discarded. Next, at 1060, the method filters the identified documents from the primary and secondary result sets having common field values with the primary and/or secondary result sets. At 1070, the method then ranks the documents according to scoring system for each document that computes a combined score for each primary document and secondary document that have common field values. The method then at 1080 retrieves the documents from the database by using the document IDs, and presents the documents according to the ranking. Although the method 1000 is shown to transpire in a particular sequence, other sequences are possible, as well, in other embodiments.

For example, assume that a join query was received that requested economic summaries for countries that won more than 50 gold medals in the past Olympics. At step 1010, the method 1000 parses a join query into a primary query and a secondary query. Generally, the primary query would query for all documents in the table Country as illustrated in FIG. 2. However, the method, at 1020*a*, does not require querying the database, but will return a primary result set containing documents IDs associated with documents in the table Country 210 by querying a search-engine index. Similarly, at 1020*b* the method returns a secondary result set containing document IDs associated with documents in the table Medal related to the secondary query. At steps 1020*a* and 1020*b*, the method 1000 has identified document IDs C1, C2, and C3 in a primary result set, and documents M1 and M3 in a secondary result set.

Using the join mapping A as illustrated in FIG. 8, at step 1030, the value of the join field is extracted for each document identified in the primary result set. At 1040, using the join mapping, determine the set of secondary documents to be attached to each primary document by identifying the set of secondary documents that have common join field values with each primary document.

Using the join mapping A illustrated in FIG. 8, at step 1030, the method identifies the value of the foreign key 'Country' (join field value) for each document ID from the primary result set and the secondary result sets. Value Set 1 ($V_1$) for the primary result set includes the 'Country' values 'USA,' 'SA,' and 'India.' Using the join mapping, at step 1040, determine the set of documents to be attached to each primary document by identifying the set of secondary documents that have common join field values with each primary document. In this case, document M1, in the secondary result set is the only document having a matching field value.

The method then, at 1060, identifies the queried for document IDs by intersecting the identified documents with the document IDs from the primary result set because the query is only interested obtaining documents containing economic summaries. In this example, C1 is the only document that matches. The method then at 1070 ranks the intersected documents, in this example, ranking may not be necessary because only one document was identified, but in the situation where more than one document is identified, the method ranks each identified document by computing a combined score for the identified document and all associated child documents, which are documents linked by foreign keys. In this example, the child document for document C1 would be document M1. The method then at 1080 retrieves document C1 from the database and presents the document in a results list on a display.

In many implementations, the tables being joined may use the same nomenclature for a common data element, as seen above; however, the possibility exists that common data elements in tables being joined may be described using different field names (different nomenclature). While not optimal from a database-design perspective, such mismatches occur when disparate systems—often not originally designed to operate together—are merged or used to supply data to a common application. In such a situation, a join table for each table with different nomenclature for common data elements are used. Similarly, multiple join tables may be implemented if a join query contains one or more join fields.

For example, assume the table Medal 240, as illustrated in FIG. 2, used a column 'CTRY,' rather than 'Country.' A join table for the column Country would not identify the documents from the table Medal 240. A join query requiring the joining of tables Country 210 and Medal 240 would require a join table for the column 'Country' and a join table for the column 'CTRY.' At steps 930b and 1040 in the methods described above, the methods would use the join table 'CTRY' to identify join field values from the secondary result sets.

In some implementations, the resulting documents are scored based on various attributes of individual documents retrieved from the primary table, documents selected using the join mappings, or both. For example, one scoring technique considers the number of documents retrieved using the join mappings as a score for the primary document. In such cases, a document having many "children" will score higher than those having few or no linked documents, and therefore the higher score indicates higher importance. In some cases, a hierarchical scoring approach may be used where a "child-count" score is computed for each document at each level of the hierarchy and summed cumulatively to obtain a total score for the primary document.

One example of a scoring technique is Lucene scoring, which uses a combination of a vector space model (VSM) of information retrieval and a Boolean model to determine how relevant a given document is to a query. In general, the VSM method computes a score based on the frequency that a query term appears in a document relative to the number of times the term appears in all the documents in the collection. As such, the higher the score the more relevant that document is to the query. Lucene uses the Boolean model to first narrow down the documents that need to be scored based on the use of Boolean logic in the query specification.

The assigned scores may be further modified (e.g., boosted or lowered) based on other data attributes, such as age (older records receiving less weight than newer ones), source, author, and/or others. The scores may then be used to influence the presentation of the documents as a response to the query by, for example, using a cut-off score to eliminate results that are not likely to be relevant or displaying the results according to the score (e.g., a ranked list).

Figure 11:
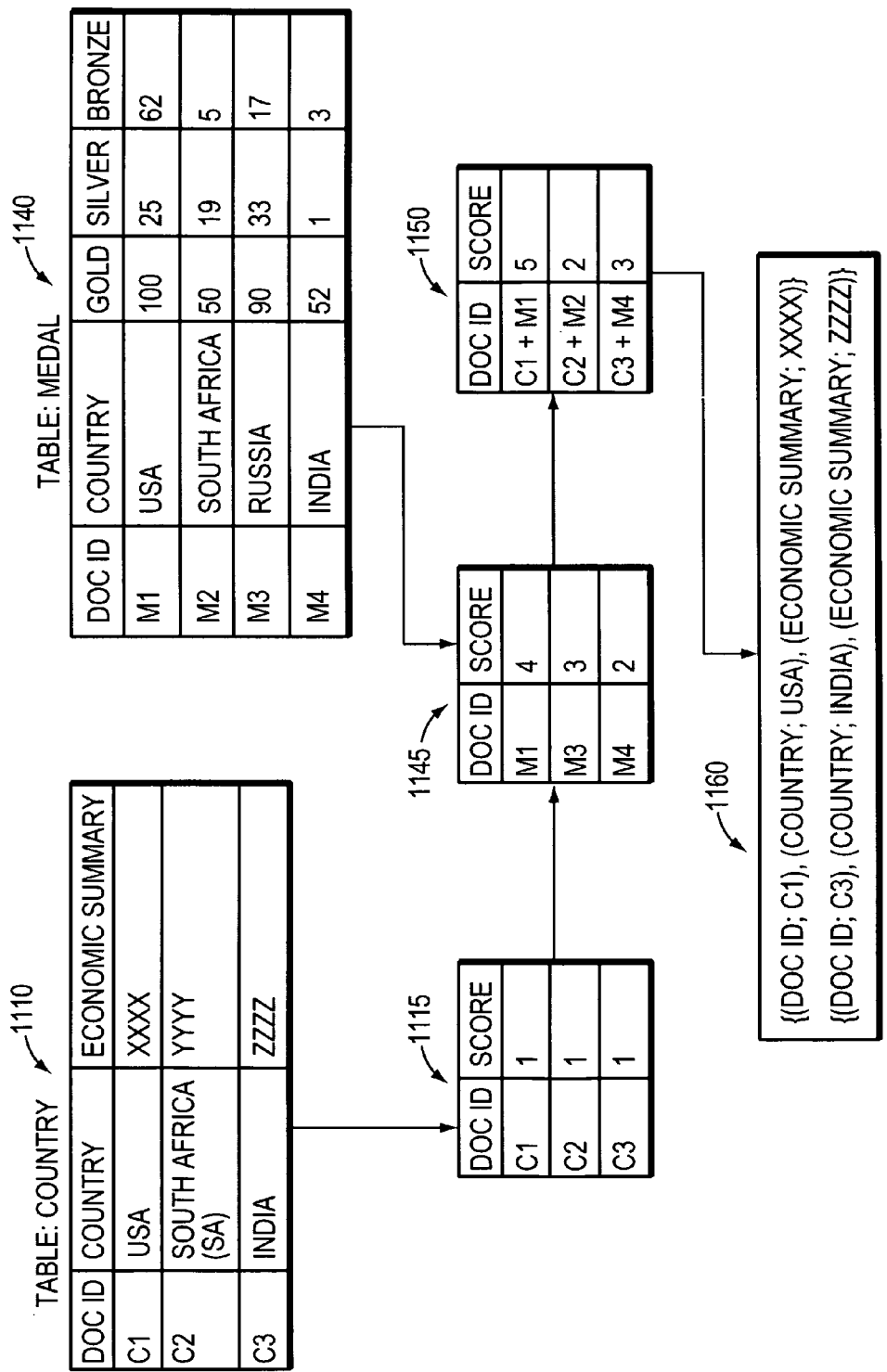
FIG. 11 a graphical representation of scoring and ranking documents.

FIG. 11 is a graphical representation of a scoring and ranking technique. For example, assume that a join query was received that requested economic summaries for countries that won more than 50 gold medals in the past Olympics. Therefore, documents need to analyzed from table Country 1110, and table Medal 1140. Using either of the methods described above, a join query is parsed into a primary query and one or more secondary queries. Each query returns a result set from a search-engine index that contains a set of document IDs associated with documents in a table.

In this case, a primary query returns documents IDs C1, C2, and C3 associated with documents from table Country 1110 in a primary result set 1115. The result set 1115 may include scores for each document ID associated with the query. Because the primary query is interested in all countries from the table Country 1110, each document ID, in this example, is given the same score. The secondary query returns all the documents from table Medal 1140 with countries that have won more than 50 gold medals. Therefore, the secondary result set 1145 contains documents M1, M3, and M4, with appropriate scores. In this case, the scores assigned to documents IDs is based on the query of more than 50 gold, and scoring for this result set is based on the number of gold medals, such that the document ID with the highest number of gold medals is given the greatest score. Result set 1145 contains document ID 'M1' with a score of 4, document ID 'M3' with a score of 3, and document ID 'M4' with a score of 2.

In this example, the query is only interested in producing the documents from table Country 1110. However, each document ID associated with documents from table Country 1110 all have the same score. A combined score table 1150 contains the combined score of all primary and linked secondary documents. Using, the method described above, a combined score is calculated for each primary document and linked secondary document. Documents are linked based on common field values. In this case document C1 is linked with M1, document C2 is linked with M2, and document C3 is linked with M4. As illustrated, the documents are ranked and presented according to the combined score. Documents C1 and C3 are the documents that are to be returned, document C1 has a score of 5, and document C3 has a score of 3. Therefore, document C1 is ranked as a first document, and C3 is ranked as the second document. As illustrated, the documents are presented in a result list 1160 according to the ranking.

Figure 12:
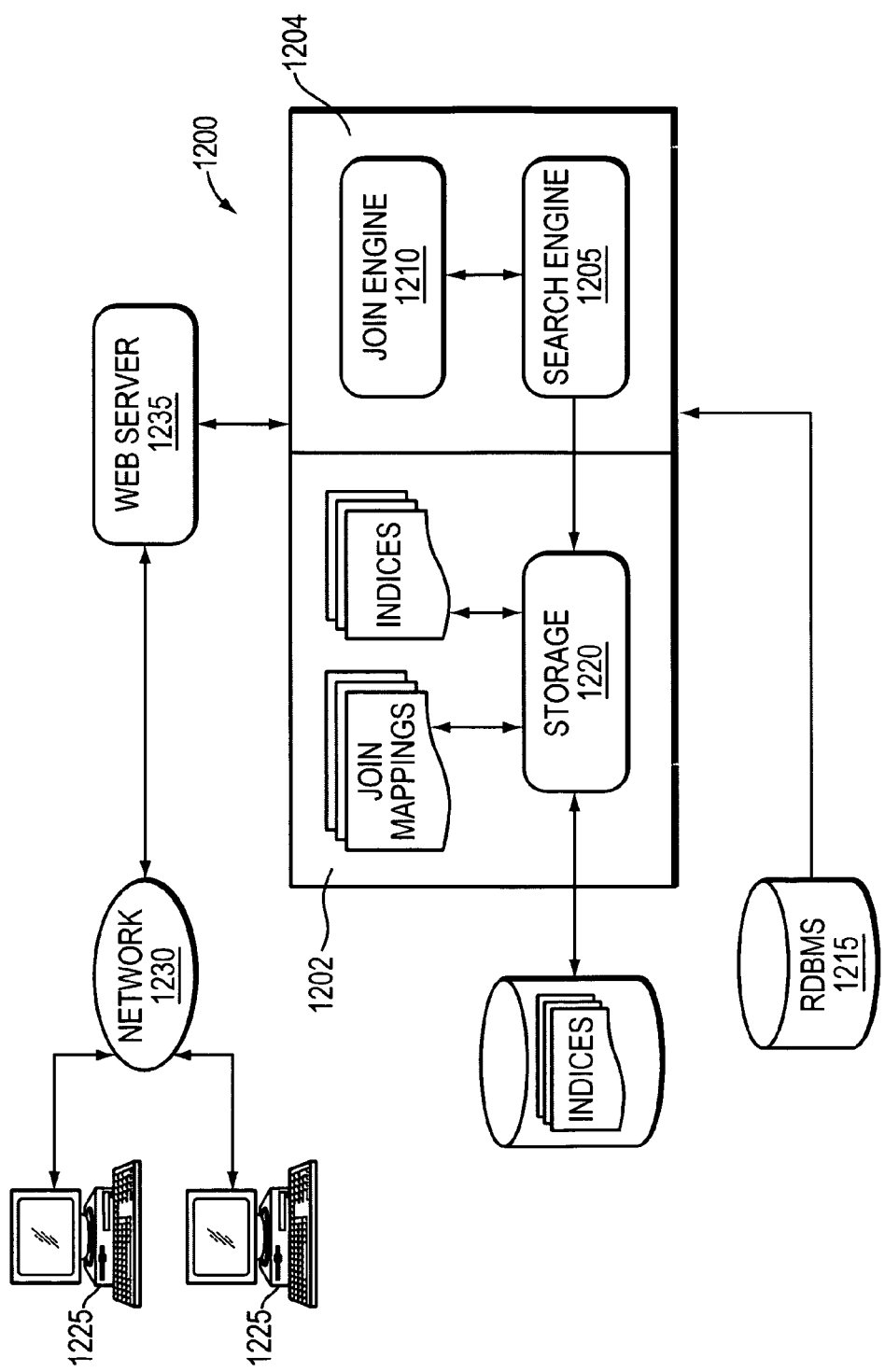
FIG. 12 is a schematic diagram of a system for querying joined data using an index.

FIG. 12 illustrates a system 1200 for querying joined data using an index. The system includes both a storage apparatus 1202 and a processing apparatus 1204. The processing apparatus 1104 includes both a join engine 1210 and search engine 1205. The processing apparatus 1104 provides the functional operations of system 1200, including the creation of search-engine indices and join mappings, and the processing of search engine queries against the indices. The storage apparatus 1102 includes storage 1220 that provides storage (volatile and non-volatile) for indices and documents.

The search engine 1205, which executes in main memory, receives queries and instructions from join engine 1210, retrieves record-based data from tables in an RDBMS 1215, and creates search-engine indices as described above. For each table, associated with a join query the search engine 1205 creates both a search-engine index having a document ID and a foreign key, and a document that includes the corresponding document ID from the search-engine index and the rest of the non-key data from the corresponding record. The join engine 1210 receives requests from users (which, in many cases, will require data from multiple tables), queries the search engine 1205 to return primary and secondary result sets for primary and secondary queries parsed from the join query. The join engine 1210 queries the search engine 1205 to provide join mappings to storage based on the parsed queries. Using the join mappings, the join engine 1210, identifies documents from the primary result sets and the secondary result sets that have common field values. The search engine 1205 may then retrieve the identified documents from the RDBMS 1215.

Storage 1220 may manage the storage of indices and join mappings. For example, storage 1220 may determine that certain indices are large and accessed infrequently, and therefore are better placed on disk, whereas other indices and/or join mappings may benefit from being placed in volatile memory (e.g. RAM) for quicker and more frequent usage.

Join engine 1210 may use the join mappings to identify a field on which a join is performed. Further, the join engine 1210 may use the join mappings to identify values for fields relative to documents. Alternatively, the join engine 1210 may use the join mappings to identify documents relative to values for fields.

Join engine 1210 may also compute a combined score for all identified documents and associated "child" documents. Join engine 1210 may also rank the identified documents according to the combined scores. Join engine 1210 may then query the search engine 1205 to retrieve the identified documents from the RDBMS 1135 and present them to a user in a list organized by the rank of each document.

In practice, the system 1200 may be implemented as part of or a module within a larger application, including, for example, web-based applications that utilize conventional search engine interfaces. In such instances, multiple clients 1225 submit queries over a network 1230. The queries are received at a web server 1235, and passed on to the system 1200 for processing. Results may then be integrated into other application pages as presented to the clients 1225.

The clients 1225 may be implemented as software running on a personal computer (e.g., a PC with an INTEL processor or an APPLE MACINTOSH processor) capable of running such operating systems as the MICROSOFT WINDOWS family of operating systems from Microsoft Corporation of Redmond, Wash., the MAC OS operating system from Apple Computer of Cupertino, Calif., and various varieties of Unix, such as SUN SOLARIS from SUN MICROSYSTEMS, and GNU/Linux from RED HAT, INC. of Durham, N.C. (and others). The clients 1195 may also be implemented on such hardware devices as a smart or dumb terminal, network computer, set top box, game player, mobile device, wireless device, personal digital assistant, media (e.g., music and/or video) player, information appliance, workstation, minicomputer, mainframe computer, or any other device with computing functionality.

The network 1230 connecting the clients to the system 1200 may include any media such as standard telephone lines, LAN or WAN links (e.g., T1, T3, 56 kb, X.25), broadband connections (ISDN, Frame Relay, ATM), wireless links (802.11, bluetooth, etc.), and so on, in any suitable combination. Preferably, the network 1230 can carry TCP/IP protocol communications, and HTTP/HTTPS requests made by the clients 1225 may be communicated over such TCP/IP networks. The type of network is not a limitation, however, and any suitable network may be used. Non-limiting examples of networks that can serve as or be part of the communications network 1230 include a wireless or wired Ethernet-based intranet, a local or wide-area network (LAN or WAN), and/or the global communications network known as the Internet, which may accommodate many different communications media and protocols.

Examples of the RDBMS 1215 that may be used to support the system 1200 include the MySQL Database Server by Sun Microsystems, the ORACLE Database Server, or the SQLServer Database Server by Microsoft.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

Various embodiments of the invention may be provided as an article of manufacture having a computer-readable medium with computer-readable instructions embodied thereon for performing the methods described in the preceding paragraphs. In particular, the functionality of a method of the present invention may be embedded on a computer-readable medium, such as, but not limited to, a floppy disk, a hard disk, an optical disk, a magnetic tape, a PROM, an EPROM, CD-ROM, or DVD-ROM or downloaded from a server. The functionality of the techniques may be embedded on the computer-readable medium in any number of computer-readable instructions, or languages such as, for example, FORTRAN, PASCAL, C, C++, Java, C#, Tcl, BASIC and assembly language. Further, the computer-readable instructions may, for example, be written in a script, macro, or functionally embedded in commercially available software (such as, e.g., EXCEL or VISUAL BASIC).

While this invention has been particularly shown and described with references to example embodiments thereof, it will be understood by those skilled in the art that various changes in form and details may be made therein without departing from the scope of the invention encompassed by the appended claims.

What is claimed is:

1. A method of accessing data in a record-based data storage system using a search engine in response to a join query, the method comprising, in an electronic processing system:
   searching documents and storing join mappings, the join mappings mapping join keys to documents and join key values to the documents;
   using an index, returning primary and secondary result sets for primary and secondary queries of the join query;
   using the join mappings, identifying documents from the primary result sets and the secondary result sets that have common field values;
   retrieving at least a subset of the identified documents from the primary result sets and the secondary result sets that have common field values.

2. The method of claim 1 wherein the join mappings identify values for fields relative to documents.

3. The method of claim 1 wherein the join mappings identify documents relative to values for fields.

4. The method of claim 1 further comprising using the join query, identifying a field on which a join is performed.

5. The method of claim 1 wherein the join query comprises an inner join between the primary and secondary queries of the join query.

6. The method of claim 1 wherein the join query comprises an outer join between the primary and secondary queries of the join query.

7. The method of claim 1 further comprising filtering the identified documents according to the join query.

8. The method of claim 1 further comprising storing the join mappings in volatile memory.

9. The method of claim 8 further comprising:
determining if sufficient volatile memory is available to store the join mappings;
if sufficient memory exists, storing the join mapping in volatile memory; and
if sufficient memory does not exist, deleting existing join mappings and storing the join mapping.

10. The method of claim 9 wherein deleting existing join mappings includes deleting the least recently used join mappings.

11. The method of claim 1 further comprising:
computing a combined score for each of the identified documents from the primary result sets and the secondary result sets that have common field values.

12. The method of claim 11 further comprising:
ranking each of the identified documents from the primary result sets and the secondary result sets that have common field values as a function of at least the combined score and presenting the at least a subset of the identified documents in a list of results on a display according to the ranking.

13. An electronic system of accessing data in a record-based data storage system using a search engine in response to a join query, the electronic system comprising:
a search engine configured to provide indices and return result sets from the indices in response to queries;
storage to store the indices and result sets;
a join engine configured to:
query the search engine to provide join mappings to storage, the join mappings mapping join keys to documents and join key values to the documents;
query the search engine to return primary and secondary result sets for primary and secondary queries of the join query;
using the join mappings and result sets, identifying documents from the primary result sets and the secondary result sets that have common field values.

14. The system of claim 13 wherein the search engine is further configured to retrieve at least a subset of the identified documents from the primary result sets and the secondary result sets that have common field values.

15. The system of claim 13 wherein the join engine is further configured to use the join mappings to identify values for fields relative to documents.

16. The system of claim 13 wherein the join engine is further configured to use the join mappings to identify documents relative to values for fields.

17. The system of claim 13 wherein the join engine is further configured to use the join query to identify a field on which a join is performed.

18. The system of claim 13 wherein the join engine is further configured to filter the identified documents according to the query.

19. The system of claim 13 wherein the join engine is further configured to parse the query as an inner join between the primary and secondary queries of the query.

20. The system of claim 13 wherein the join engine is further configured to parse the query as an outer join between the primary and secondary queries of the query.

21. The system of claim 13 wherein the storage is further configured to store the join mappings in volatile memory.

22. The system of claim 21 wherein the storage is further configured to:
1) determine if sufficient volatile memory is available to store the join mappings;
2) if sufficient memory exists, store the join mapping in volatile memory; and
3) if sufficient memory does not exist, delete existing join mappings and store the join mapping.

23. The system of claim 22 wherein the storage is further configured to delete the least recently used join mappings.

24. The system of claim 13 wherein the join engine is further configured to compute a combined score for each of the identified documents from the primary result sets and the secondary result sets that have common field values.

25. The system of claim 24 wherein the join engine is further configured to rank each of the identified documents from the primary result sets and the secondary result sets that have common field values as a function of at least the combined score.

26. The system of claim 25 wherein the search engine is further configured to retrieve and present the at least a subset of the identified documents from the primary result sets and the secondary result sets that have common field values in a list of results on a display according to the ranking.

27. An article of manufacture having computer-readable program portions embedded thereon for accessing data in a record-based data storage system in response to a join query, the program portions comprising instructions for:
searching documents and storing join mappings, the join mappings mapping join keys to documents and join key values to the documents;
using an index, returning primary and secondary result sets for primary and secondary queries of the join query;
using the join mappings, identifying documents from the primary result sets and the secondary result sets that have common field values;
retrieving at least a subset of the identified documents from the primary result sets and the secondary result sets that have common field values.

28. The article of manufacture of claim 27 wherein the join mappings identify values for fields relative to documents.

29. The article of manufacture of claim 27 wherein the join mappings identify documents relative to values for fields.

30. The article of manufacture of claim 27 wherein the program portions further comprise instructions for using the join query, identifying a field on which a join is performed.

31. The article of manufacture of claim 27 wherein the join query comprises an inner join between the primary and secondary queries of the join query.

32. The article of manufacture of claim 27 wherein the join query comprises an outer join between the primary and secondary queries of the join query.

33. The article of manufacture of claim 27 wherein the program portions further comprise instructions for filtering the identified documents according to the join query.

34. The article of manufacture of claim 27 wherein the program portions further comprise instructions for storing the join mappings in volatile memory.

35. The article of manufacture of claim 27 wherein the program portions further comprise instructions for:
determining if sufficient volatile memory is available to store the join mappings;
if sufficient memory exists, storing the join mapping in volatile memory; and if sufficient memory does not exist, deleting existing join mappings and storing the join mapping.

36. The article of manufacture of claim 35 wherein deleting existing join mappings includes deleting the least recently used join mappings.

37. The article of manufacture of claim 27 wherein the program portions further comprise instructions for computing a combined score for each of the identified documents from the primary result sets and the secondary result sets that have common field values.

38. The article of manufacture of claim 37 wherein the program portions further comprise instructions for ranking each of the identified documents from the primary result sets and the secondary result sets that have common field values as a function of at least the combined score and presenting the at least a subset of the identified documents in a list of results on a display according to the ranking.

\* \* \* \* \*